United States Patent [19]

Nettles

[11] 4,043,577
[45] Aug. 23, 1977

[54] SANDING DEVICE FOR INCREASED VEHICLE TRACTION

[75] Inventor: Robbie B. Nettles, Poulsbo, Wash.

[73] Assignee: The Raymond Lee Organization, Inc., New York, N.Y. ; a part interest

[21] Appl. No.: 712,475

[22] Filed: Aug. 9, 1976

[51] Int. Cl.² .................. B60B 39/06; B61C 15/10
[52] U.S. Cl. .......................................... 291/25; 291/38
[58] Field of Search .................. 291/1, 2, 25, 38, 35, 291/34, 36, 39, 40; 280/757; 222/80, 81, 85, 87; 244/136; 214/305

[56] References Cited

U.S. PATENT DOCUMENTS

| | | | |
|---|---|---|---|
| 539,395 | 5/1895 | Schiess | 291/36 |
| 746,691 | 12/1903 | Gardner | 291/34 |
| 1,611,406 | 12/1926 | Bell | 222/85 |
| 1,833,084 | 11/1931 | Liedberg | 291/38 |
| 3,224,609 | 12/1965 | Dietert | 214/305 |
| 3,271,061 | 9/1966 | Miller | 291/38 |

Primary Examiner—Trygve M. Blix
Assistant Examiner—Reinhard J. Eisenzopf
Attorney, Agent, or Firm—Daniel Jay Tick

[57] ABSTRACT

A box is mounted on the chassis of a vehicle above and forward of a selected one of the wheels of the vehicle. A side panel removably encloses an open side of the box and has a plurality of spikes extending from the inside surface thereof for puncturing a bag in the box. A control rod extends from the outside surface of the side panel to the cab of the vehicle to permit movement of the panel from within the cab. A volume control device is movably mounted at an opening through the bottom of the box and extends into the cab of the vehicle for controlling the volume of material passing from a bag in the box through the opening in the bottom of the box.

1 Claim, 3 Drawing Figures

U.S. Patent
Aug. 23, 1977
4,043,577
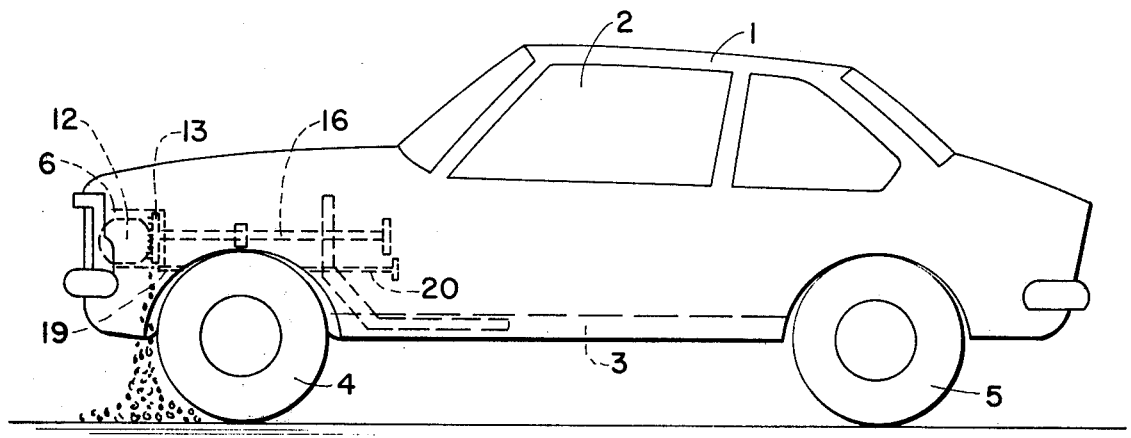
FIG. 1
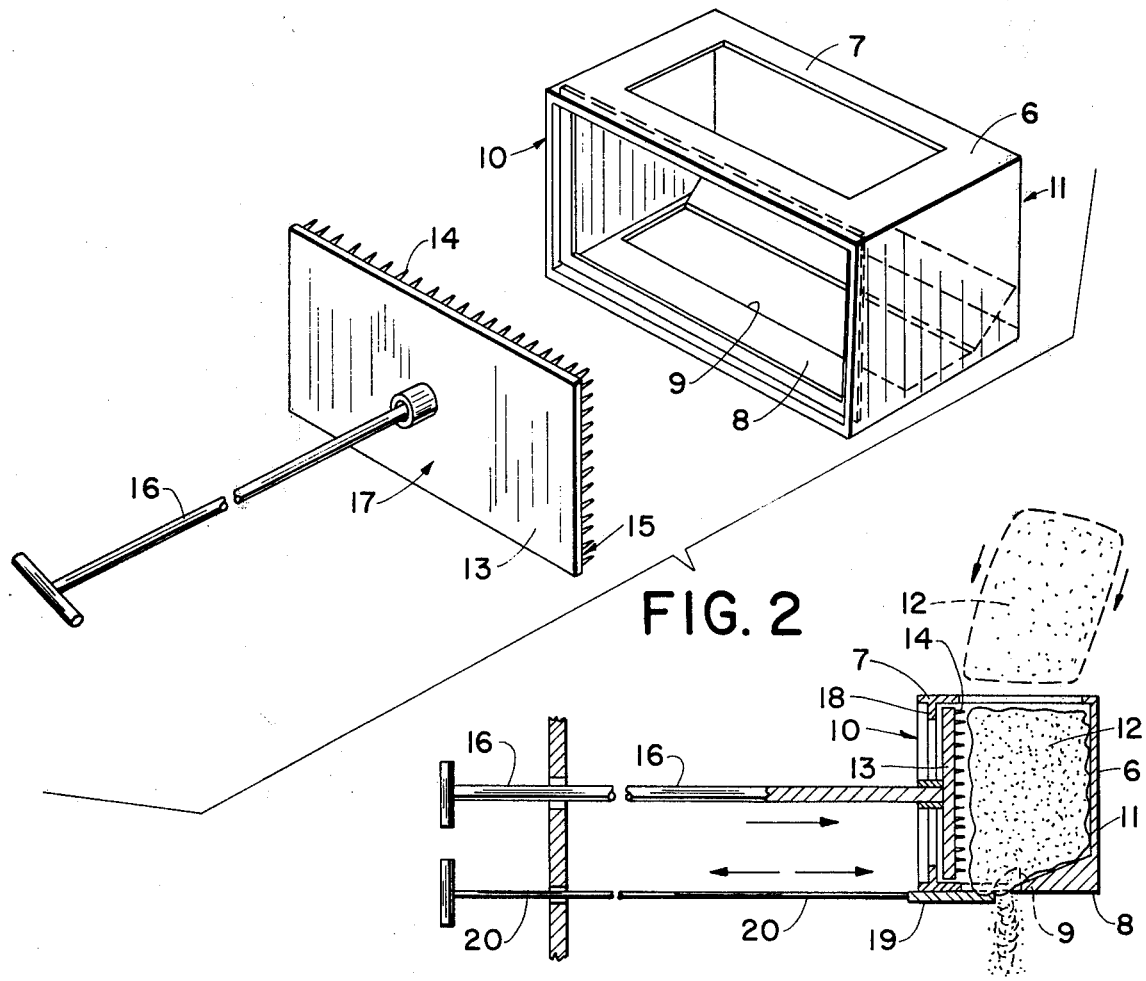
FIG. 2
FIG. 3

SANDING DEVICE FOR INCREASED VEHICLE TRACTION

BACKGROUND OF THE INVENTION

The present invention relates to a vehicle accessory. More particularly, the invention relates to a vehicle accessory for an automotive vehicle having a cab, a chassis and a plurality of wheels rotatably mounted on the chassis.

Objects of the invention are to provide a vehicle accessory of simple structure, which is inexpensive in manufacture, installed with facility and convenience and rapidity in new and existing motor vehicles, and functions efficiently, effectively and reliably to provide traction for selected wheels of the vehicle when the vehicle is in difficulty on very slippery surfaces such as, for example, ice.

BRIEF DESCRIPTION OF THE DRAWINGS

In order that the invention may be readily carried into effect, it will now be described with reference to the accompanying drawings, wherein:

FIG. 1 is a schematic diagram illustrating the mounting of the vehicle accessory of the invention in an automotive vehicle;

FIG. 2 is an exploded view of part of an embodiment of the vehicle accessory of the invention; and FIG. 3 is a side view, partly in section, of an embodiment of the vehicle accessory of the invention.

DETAILED DESCRIPTION OF THE INVENTION

The vehicle accessory of the invention is for an automotive vehicle 1 having a cab 2 and a chassis 3, and a plurality of wheels, of which two wheels 4 and 5 are shown, rotatably mounted on the chassis, as shown in FIG. 1.

The vehicle accessory of the invention comprises a box 6 mounted on the chassis 3 of the vehicle 1 above and forward of a selected one of the wheels of the vehicle. The box has an open top 7 (FIGS. 2 and 3), a bottom 8 substantially parallel to the top and having an opening 9 formed therethrough (FIGS. 2 and 3). The box 6 also has a pair of spaced parallel sides 10 and 11 (FIGS. 2 and 3) substantially perpendicular to the top and bottom. The side 10 is open.

As shown in FIG. 3, the top 7 of the box 6 admits a bag 12 of sand, ice-dissolving chemicals, and the like.

A side panel 13 (FIGS. 2 and 3) removably encloses the open side 10 of the box 6. The panel 13 has a plurality of spikes 14, and so on (FIGS. 2 and 3) extending from the inner surface 15 thereof (FIG. 2) for puncturing the bag 12 in the box. A control rod 16 (FIGS. 2 and 3) extends from the outside surface 17 (FIG. 2) of the panel 13 to the cab 2 of the vehicle 1 to permit movement of the panel from within the cab.

The panel 17 is prevented from leaving the box 16 by a frame member 18 which borders the open side 10.

A volume control device is movably mounted at the bottom 8 of the box and extends into the cab 2 of the vehicle 1 for controlling the volume of material passing from the bag 12 in the box 6 through the opening 9 in the bottom 8 of said box from the cab of the vehicle. The volume control device comprises a plate 19 movably mounted over the opening 9 in the bottom 8 of the box, as shown in FIG. 3, for selectively uncovering a desired part of said opening. A control rod 20 (FIG. 3) extends from the plate 19 to the cab 2 of the vehicle 1 to permit movement of said plate from within said cab.

While the invention has been described by means of a specific example and in a specific embodiment, I do not wish to be limited thereto, for obvious modifications will occur to those skilled in the art without departing from the spirit and scope of the invention.

I claim:

1. A vehicular accessory for an automotive vehicle having a cab, a chassis and a plurality of wheels rotatably mounted on the chassis, said vehicular accessory comprising a box mounted on the chassis of a vehicle above and forward of a selected one of the wheels of the vehicle, said box having an open top, a bottom substantially parallel to the top and having an opening formed therethrough and two pairs of spaced parallel sides substantially perpendicular to the top and bottom, one of the sides being open, the top admitting a bag of sand, ice-dissolving chemicals, and the like;

a side panel removably enclosing the open side of the box, said panel having a plurality of spikes extending from the inside surface thereof for puncturing a bag in the box and a control rod extending from the outside surface thereof to the cab of the vehicle to permit movement of said panel from within said cab; and volume control means movably mounted at the bottom of the box and extending into the cab of the vehicle for controlling the volume of material passing from a bag in the box through the opening in the bottom of the box from the cab of the vehicle, said volume control means comprising a plate movably mounted over the opening in the bottom of the box for selectively uncovering a desired part of said opening and a control rod extending from the plate to the cab of the vehicle to permit movement of said plate from within said cab.

* * * * *